United States Patent [19]

Clegg

[11] Patent Number: 4,613,213

[45] Date of Patent: * Sep. 23, 1986

[54] MONOCHROMATIC BEAM CONCENTRATOR

[76] Inventor: John E. Clegg, 2320 Keystone Dr., Orlando, Fla. 32806

[*] Notice: The portion of the term of this patent subsequent to Dec. 3, 2002 has been disclaimed.

[21] Appl. No.: 658,258

[22] Filed: Oct. 5, 1984

[51] Int. Cl.$^4$ .............................. G02B 3/04; F24J 2/08
[52] U.S. Cl. ........................................ 350/432; 126/440
[58] Field of Search ................................... 350/432–435

[56] References Cited

U.S. PATENT DOCUMENTS

| | | | |
|---|---|---|---|
| 2,881,654 | 4/1959 | Toffolo | 350/432 |
| 2,882,784 | 4/1959 | Toffolo | 350/432 |
| 4,277,148 | 7/1981 | Clegg | 350/432 |
| 4,325,612 | 4/1982 | Clegg | 350/432 |
| 4,333,713 | 6/1982 | Clegg | 350/432 |
| 4,556,294 | 12/1985 | Clegg | 350/432 |

*Primary Examiner*—John K. Corbin
*Assistant Examiner*—Scott J. Sugarman

[57] ABSTRACT

An upper stage lens which receives a convergent conical incipient beam and emits a concentrated whole beam into a lower stage lens which emits a concentrated whole beam. The upper stage lens can be any one of the spectral colors.

1 Claim, 2 Drawing Figures

MONOCHROMATIC BEAM CONCENTRATOR

BACKGROUND

The concentrator has a code designation of 3RT:CM (R—refracting section of a stage or component lens. T—transmitting section of a stage or component lens, C—concentrating stage lens, and M—monochromatic).

Prior art is limited to conical beam concentrators which receive circular whole incipient beams and emit concentrated whole beams which are not monochromatic.

DRAWINGS

DESCRIPTION

FIG. is shows the monochromatic beam concentrator 3RT:CM with upper stage lens RT 1 mounted above lower stage lens 2RT 2 inside casing 3. Lower stage lens 2RT 2 consists of upper component lens RT 4 and lower component lens RT 5.

Upper stage lens RT 1 is mounted on the roof of a building so as to receive a convergent conical beam of diffused sunlight which is projected through a light conduit to the lower stage lens 2RT 2 in the room below. This is the means by which spectral beams can be produced without direct sunlight, thereby eliminating the need of tracking devices.

Upper stage lens RT 1 can be any one of the spectral colors.

Figure 1:
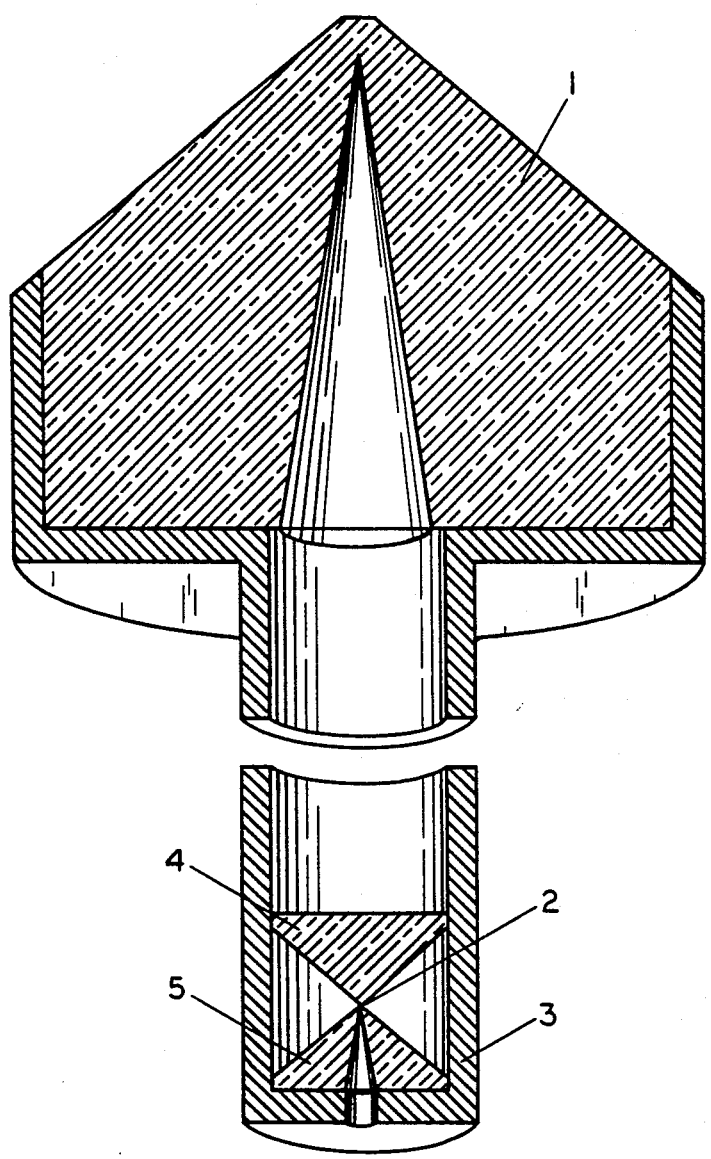
FIG. 1 is an elevation of the monochromatic beam concentrator with the lenses shown in section.
Figure 2:
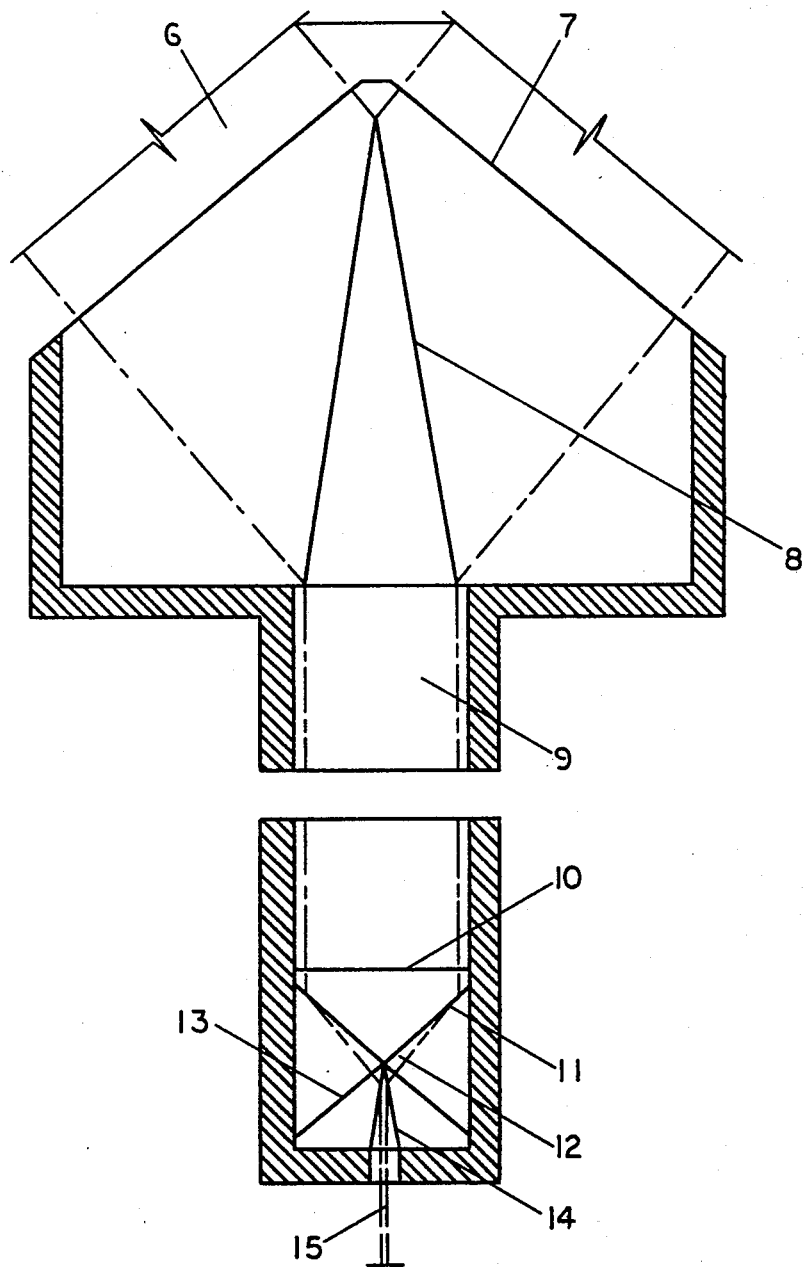
FIG. 2 is an elevation of the beam concentrator with a ray diagram.

FIG. 2 is an elevation of the monochromatic beam concentrator 3RT:CM with a ray diagram. Convergent conical incipient beam 6 or diffused sunlight is received by convex conical section 7 and transmitted to concave conical section 8 which refracts and emits the beam as concentrated whole beam 9.

Beam 9 is received and transmitted by planar section 10 and refracted by convex conical section 11, producing convergent conical beam 12.

Beam 12 is received and transmitted by convex conical section 13 and refracted by concave conical section 14, emitting concentrated whole beam 15 parallel to the vertical optic axis of the concentrator.

I claim:

1. A monochromatic beam concentrator 3RT:CM comprising an upper stage lens RT (1) of monochromatic glass having a convex conical section (7) which receives and transmits a convergent conical incipient beam (6) of diffused sunlight, and having a concave conical section (8) which refracts and emits incipient beam (6), forming concentrated whole beam (9) which is emitted parallel to the vertical optic axis; and comprising a lower stage lens 2RT (2) mounted below upper stage lens RT (1) and comprising an upper component lens RT (4) having a planar section (10) which receives and transmits concentrated whole beam (9), and having a convex conical section (11) which refracts concentrated whole beam (9), forming convergent conical beam (12); and comprising a lower component lens RT (5) having a convex conical section (13) which transmits convergent conical beam (12), and having a concave conical section (14) which refracts and emits convergent conical beam (12), forming concentrated whole beam (15) which is emitted parallel to the vertical optic axis.

* * * * *